US011391824B2

(12) United States Patent
Kubota et al.

(10) Patent No.: US 11,391,824 B2
(45) Date of Patent: Jul. 19, 2022

(54) DISTANCE MEASURING DEVICE AND DISTANCE MEASURING METHOD

(71) Applicants: KABUSHIKI KAISHA TOSHIBA, Minato-ku (JP); TOSHIBA ELECTRONIC DEVICES & STORAGE CORPORATION, Minato-ku (JP)

(72) Inventors: Hiroshi Kubota, Fussa (JP); Nobu Matsumoto, Ebina (JP)

(73) Assignees: KABUSHIKI KAISHA TOSHIBA, Minato-ku (JP); TOSHIBA ELECTRONIC DEVICES & STORAGE CORPORATION, Minato-ku (JP)

( * ) Notice: Subject to any disclaimer, the term of this patent is extended or adjusted under 35 U.S.C. 154(b) by 722 days.

(21) Appl. No.: 16/297,783

(22) Filed: Mar. 11, 2019

(65) Prior Publication Data
US 2020/0088853 A1 Mar. 19, 2020

(30) Foreign Application Priority Data
Sep. 18, 2018 (JP) .............................. JP2018-173543

(51) Int. Cl.
*G01S 7/00* (2006.01)
*G01S 7/4865* (2020.01)
*G01S 7/4863* (2020.01)

(52) U.S. Cl.
CPC .......... *G01S 7/4865* (2013.01); *G01S 7/4863* (2013.01)

(58) Field of Classification Search
USPC ....................................................... 356/5.01
See application file for complete search history.

(56) References Cited

U.S. PATENT DOCUMENTS 6,665,056 B2    12/2003   Shirai et al.
7,630,062 B2 *  12/2009   Mori ....................... G01S 17/10
                                                                    356/5.01
8,013,752 B2 *   9/2011   Klaus ...................... G01S 17/04
                                                                    340/635
(Continued)

FOREIGN PATENT DOCUMENTS

CN          108513618 A      9/2018
EP          0 782 007 A2     7/1997
(Continued)

OTHER PUBLICATIONS

European Search Report for EP 3627177 (2 pages) (Year: 2021).*
European Search Opinion for EP 3627177 (4 pages) (Year: 2021).*

*Primary Examiner* — James R Hulka
(74) *Attorney, Agent, or Firm* — Oblon, McClelland, Maier & Neustadt, L.L.P.

(57) ABSTRACT

A distance measuring device according to an embodiment includes a time acquisition circuit and a distance measurement circuit. The time acquisition circuit acquires a rising time in which a measurement signal obtained by converting reflected light of a laser beam from an object into a signal reaches a first threshold and a falling time in which the measurement signal reaches a second threshold after reaching the first threshold. The distance measurement circuit measures the distance to a target object on the basis of a time difference between timing based on the rising time and the falling time and irradiation timing of the laser beam.

18 Claims, 14 Drawing Sheets

(56) References Cited

U.S. PATENT DOCUMENTS

| | | | |
|---|---|---|---|
| 8,780,331 B2* | 7/2014 | Spruck | G01S 17/36 |
| | | | 356/5.01 |
| 10,302,747 B2* | 5/2019 | Suzuki | G01S 17/42 |
| 10,473,785 B2* | 11/2019 | Kubota | G01S 7/4863 |
| 10,739,456 B2* | 8/2020 | Kubota | G01S 7/4863 |
| 2003/0103197 A1 | 6/2003 | Shirai et al. | |
| 2006/0001859 A1* | 1/2006 | Lohmann | G01S 17/10 |
| | | | 356/5.06 |
| 2008/0068584 A1* | 3/2008 | Mori | G01S 7/4865 |
| | | | 356/5.01 |
| 2009/0121886 A1* | 5/2009 | Klaus | G01S 17/04 |
| | | | 340/635 |
| 2012/0086933 A1* | 4/2012 | Spruck | G01S 17/36 |
| | | | 356/5.01 |
| 2016/0299219 A1 | 10/2016 | Suzuki et al. | |
| 2017/0363740 A1 | 12/2017 | Kubota et al. | |
| 2019/0086542 A1 | 3/2019 | Kubota et al. | |
| 2019/0317639 A1* | 10/2019 | Winkler | G01P 3/366 |
| 2021/0063575 A1* | 3/2021 | Kubota | G01S 17/10 |

FOREIGN PATENT DOCUMENTS

| | | |
|---|---|---|
| EP | 0 782 007 A3 | 7/1997 |
| JP | 3249003 B2 | 1/2002 |
| JP | 2003-167054 A | 6/2003 |
| JP | 2005-331526 A | 12/2005 |
| JP | 2014-81254 A | 5/2014 |
| JP | 2016-14535 A | 1/2016 |
| JP | 2016-176750 A | 10/2016 |
| JP | 2018-54426 A | 4/2018 |
| JP | 2019-52978 A | 4/2019 |
| WO | WO 2015/098469 A1 | 7/2015 |

* cited by examiner

DISTANCE MEASURING DEVICE AND DISTANCE MEASURING METHOD

CROSS-REFERENCE TO RELATED APPLICATIONS

This application is based upon and claims the benefit of priority from the prior Japanese Patent Application No. 2018-173543, filed on Sep. 18, 2018 the entire contents of which are incorporated herein by reference.

FIELD

Embodiments of the present invention relate to a distance measuring device and a distance measuring method.

BACKGROUND

There is known a distance measuring device called LIDAR (Light Detection and Ranging, Laser Imaging Detection and Ranging). The distance measuring device irradiates laser light on a measurement target object and converts the intensity of reflected light reflected by the measurement target object into a time-series measurement signal on the basis of an output of a sensor. Consequently, the distance to the measurement target object is measured on the basis of a time difference between a point in time of emission of the laser light and a point in time corresponding to a peak of a signal value of the measurement signal.

However, when the number of input photons per unit time to a sensor increases, an output signal value of the sensor is sometimes saturated. Measurement accuracy is likely to be deteriorated.

DETAILED DESCRIPTION

Figure 1:
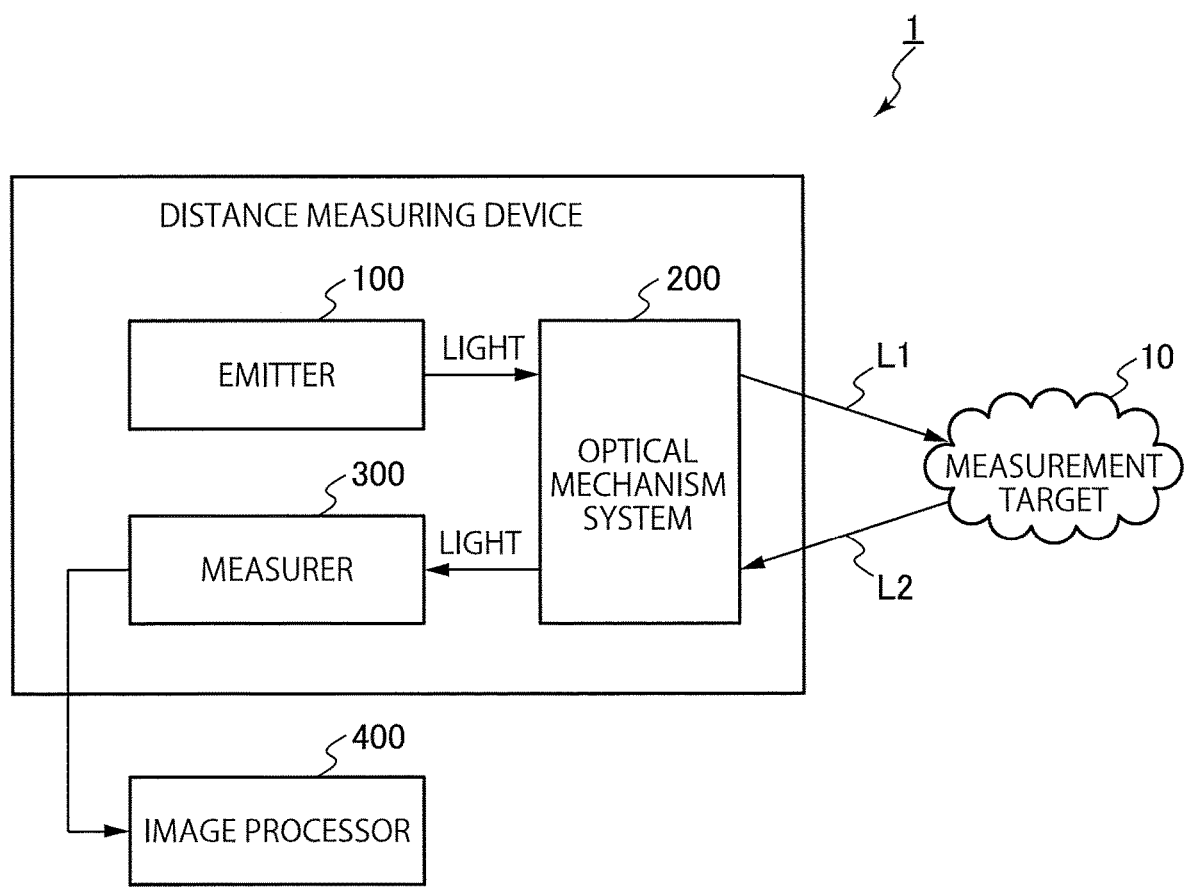
FIG. 1 is a diagram showing a schematic overall configuration of a distance measuring device according to a first embodiment.

A distance measuring device according to an embodiment includes a time acquisition circuit and a distance measurement circuit. The time acquisition circuit acquires a rising time in which a measurement signal obtained by converting reflected light of a laser beam from an object into a signal reaches a first threshold and a falling time in which the measurement signal reaches a second threshold after reaching the first threshold. The distance measurement circuit measures the distance to a target object on the basis of a time difference between timing based on the rising time and the falling time and irradiation timing of the laser beam.

Distance measuring devices and distance measuring methods according to embodiments of the present invention are explained in detail below with reference to the drawings. Note that the embodiments explained below are examples of embodiments of the present invention. The present invention is not interpreted to be limited to the embodiments. In the drawings referred to in the embodiments, the same portions and portions having the same functions are denoted by the same or similar reference numerals and signs. Repeated explanation of the portions is sometimes omitted. Dimension ratios of the drawings are sometimes different from actual ratios for convenience of explanation. A part of components is sometimes omitted from the drawings.

First Embodiment

FIG. 1 is a diagram showing a schematic overall configuration of a distance measuring device 1 according to an embodiment. As shown in FIG. 1, the distance measuring device 1 generates a distance image of a measurement target object 10 using a scanning scheme or a TOF (Time Of Flight) scheme. More specifically, the distance measuring device 1 includes an emitter 100, an optical mechanism system 200, a measurer 300, and an image processor 400.

The emitter 100 intermittently emits laser light L1. The optical mechanism system 200 irradiates the laser light L1 emitted by the emitter 100 on the measurement target object 10 and makes reflected light L2 of the laser light L1 reflected on the measurement target object 10 incident on the measurer 300. The laser light means light having an aligned phase and an aligned frequency.

The measurer 300 measures the distance to the measurement target object 10 on the basis of the reflected light L2 received via the optical mechanism system 200. That is, the measurer 300 measures the distance to the measurement target object 10 on the basis of a time difference between a point in time when the emitter 100 irradiates the laser light L1 on the measurement target object 10 and a point in time when the reflected light L2 is measured.

The image processor 400 performs removal of noise, distortion correction, and interpolation processing and outputs final distance image data on the basis of distances to a plurality of measurement points on the measurement target object 10. The image processor 400 may be incorporated in a housing of the distance measuring device 1.

Figure 2:
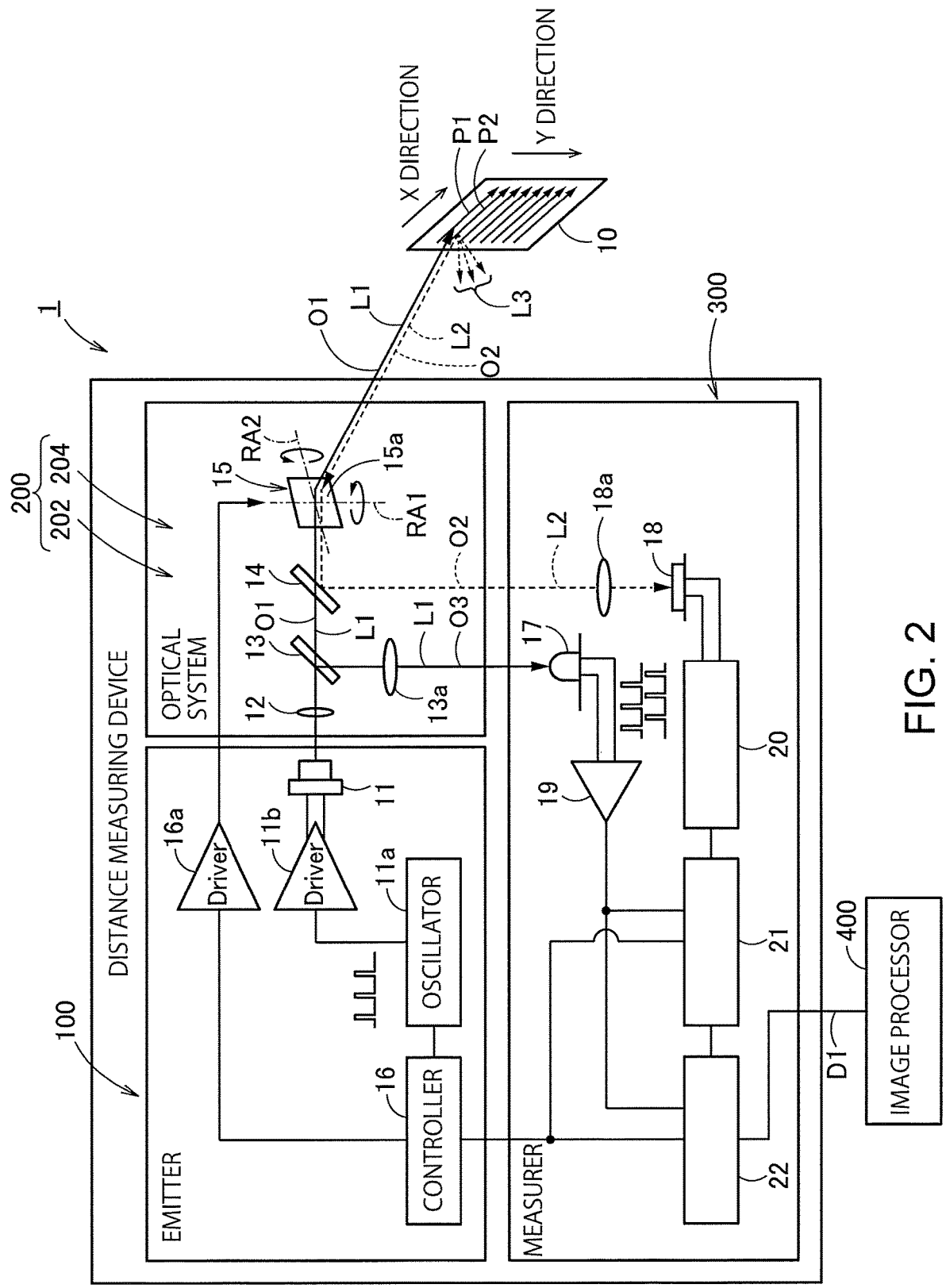
FIG. 2 is a diagram showing a configuration example of the distance measuring device according to the first embodiment.

More detailed configuration examples of the emitter 100, the mechanism optical mechanism system 200, and the measurer 300 of the distance measuring device 1 according to the first embodiment are explained with reference to FIG. 2. FIG. 2 is a diagram showing a configuration example of the distance measuring device 1 according to the first embodiment. As shown in FIG. 2, the distance measuring device 1 includes the emitter 100, the optical mechanism system 200, the measurer 300, and the image processor 400. Among scattered lights L3, scattered light in a predetermined direction is referred to as reflected light L2.

The emitter 100 includes a light source 11, an oscillator 11a, a first driving circuit 11b, a controller 16, and a second driving circuit 16a.

The optical mechanism system 200 includes an irradiation optical system 202 and a light-receiving optical system 204. The irradiation optical system 202 includes a lens 12, a first optical element 13, a lens 13a, and a mirror (a reflection device) 15.

The light-receiving optical system 204 includes a second optical element 14 and the mirror 15. That is, the irradiation optical system 202 and the light-receiving optical system 204 share the mirror 15.

The measurer 300 includes a photodetector 17, a sensor 18, a lens 18a, a first amplifier 19, a second amplifier 20, a time acquirer 21, and a distance measurer 22. Note that, as an existing method for scanning light, there is a method of rotating the distance measuring device 1 to scan light (hereinafter referred to as rotating method). As another existing method for scanning light, there is an OPA method (Optical Phased Array). This embodiment does not rely on a method of scanning light. Therefore, light may be scanned by the rotating method or the OPA method.

The oscillator 11a of the emitter 100 generates a pulse signal on the basis of control by the controller 16. The first driving circuit 11b drives the light source 11 on the basis of the pulse signal generated by the oscillator 11a. The light source 11 is a laser light source such as a laser diode. The light source 11 intermittently emits the laser light L1 according to driving by the first driving circuit 11b.

Figure 3:
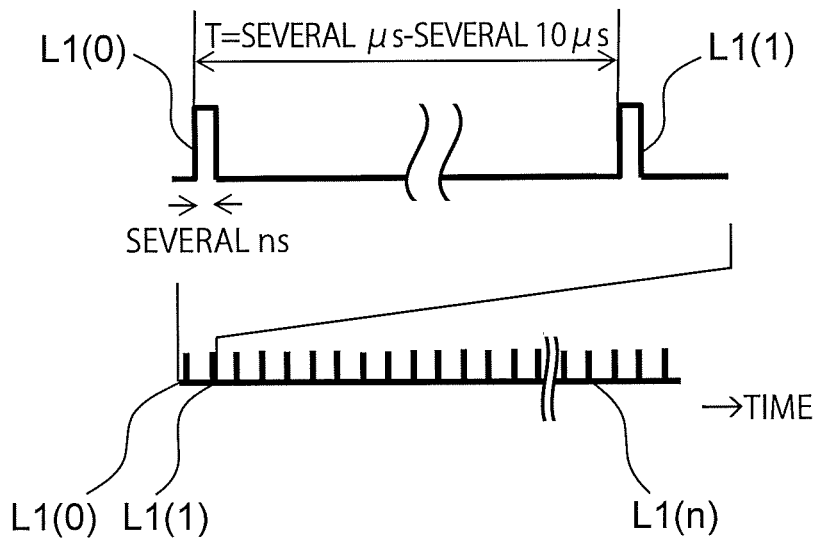
FIG. 3 is a diagram schematically showing an emission pattern of a light source.

FIG. 3 is a diagram schematically showing an emission pattern of the light source 11. In FIG. 3, the horizontal axis indicates time and the vertical axis indicates emission timing of the light source 11. A figure on the lower side is a partially enlarged view in a figure on the upper side. As shown in FIG. 3, the light source 11 intermittently repeatedly emits laser light $L1(n)$ ($0 \leq n < N$), for example, at an interval of T=several microseconds to several ten microseconds. The laser light L1 emitted n-th is represented as $L1(n)$. For example, "N" indicates the number of times of irradiation of the laser light $L1(n)$ irradiated to measure the measurement target object 10.

As shown in FIG. 2, the light source 11, the lens 12, the first optical element 13, the second optical element 14, and the mirror 15 are disposed in this order on an optical axis O1 of the irradiation optical system 202. Consequently, the lens 12 condenses the intermittently emitted laser light L1 and guides the laser light L1 to the first optical element 13.

The first optical element 13 transmits the laser light L1 and makes a part of the laser light L1 incident on the photodetector 17 along an optical axis O3. The first optical element 13 is, for example, a beam splitter.

The second optical element 14 further transmits the laser light L1 transmitted through the first optical element 13 and makes the laser light L1 incident on the mirror 15. The second optical element 14 is, for example, a half mirror.

The mirror 15 includes a reflection surface 15a that reflects the laser light L1 intermittently emitted from the light source 11. The reflection surface 15a is capable of rotating around, for example, two rotation axes RA1 and RA2 crossing each other. Consequently, the mirror 15 cyclically changes an irradiation direction of the laser light L1.

The controller 16 includes, for example, a CPU (Central Processing Unit) and a storage that stores a program and executes control by executing the program. The controller 16 performs, on the second driving circuit 16a, control for continuously changing an inclination angle of the reflection surface 15a. The second driving circuit 16a drives the mirror 15 according to a driving signal supplied from the controller 16. That is, the controller 16 controls the second driving circuit 16a to change the irradiation direction of the laser light L1.

Figure 4:
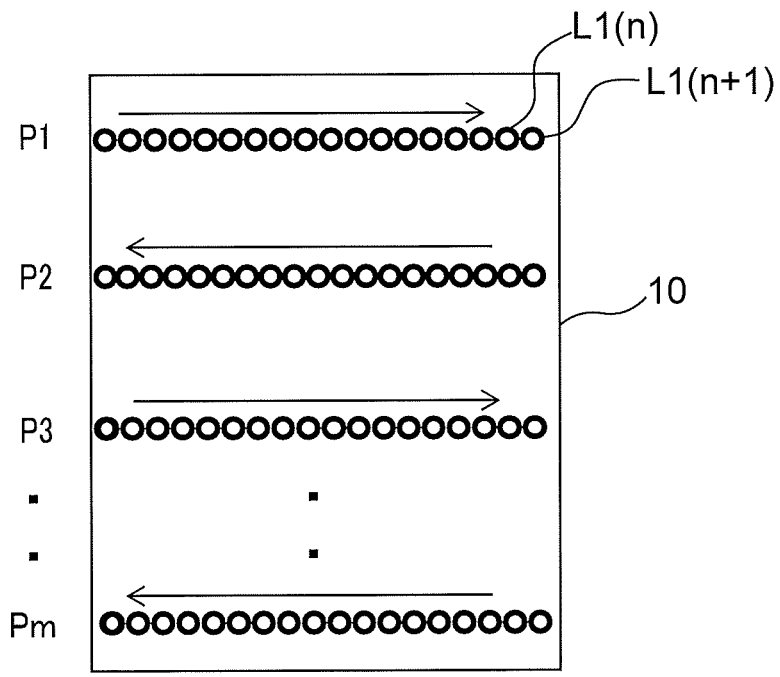
FIG. 4 is a schematic diagram enlarging and showing irradiation positions of respective laser beams on a measurement target object.

FIG. 4 is a schematic diagram enlarging and showing irradiation positions of the laser light L1 on the measurement target object 10. As shown in FIG. 4, the reflection surface 15a changes the irradiation direction for each laser light L1 and discretely irradiates the laser light L1 along a substantially parallel plurality of linear paths P1 to Pm (m is a natural number equal to or larger than 2) on the measurement target object 10. In this way, the distance measuring device 1 according to this embodiment irradiates the laser light $L1(n)$ ($0 \leq n < N$) toward the measurement target object 10 once at a time while changing an irradiation direction $O(n)$ ($0 \leq n < N$) of the laser light $L1(n)$. The irradiation direction of the laser light $L1(n)$ is represented as $O(n)$. That is, in the distance measuring device 1 according to this embodiment, the laser light $L1(n)$ is irradiated once in the irradiation direction $O(n)$.

An interval of irradiation positions of laser lights $L1(n)$ and $L1(n+1)$ on the measurement target object 10 corresponds to the irradiation interval T=several microseconds to several ten microseconds (FIG. 3) between the laser lights L1. In this way, the laser lights L1 having different irradiation directions are discretely irradiated on the linear paths P1 to Pm. Note that the number of linear paths and a scanning direction are not particularly limited.

As shown in FIG. 2, on an optical axis O2 of the light receiving optical system 204, the reflection surface 15a of the mirror 15, the second optical element 14, the lens 18a, and the sensor 18 are disposed in the order of incidence of the reflected light L2. The optical axis O1 is a focal axis of the lens 12 that passes the center position of the lens 12. The optical axis O2 is a focal axis of the lens 18a that passes the center position of the lens 18a.

The reflection surface 15a makes the reflected light L2 traveling along the optical axis O2 among the scattered lights L3 scattered on the measurement target object 10 incident on the second optical element 14. The second optical element 14 changes a traveling direction of the reflected light L2 reflected on the reflection surface 15a and makes the reflected light L2 incident on the lens 18a of the measurer 300 along the optical axis O2. The lens 18a condenses the reflected light L2 made incident along the optical axis O2 to the sensor 18.

On the other hand, a traveling direction of light reflected in a direction different from the direction of the laser light L1 among the scattered lights L3 deviates from the optical axis O2 of the light-receiving optical system 204. Therefore, even if the light reflected in the direction different from the direction of the optical axis O2 among the scattered lights L3 is made incident in the light-receiving optical system 204, the light is absorbed by a black body in a housing in which the light-receiving optical system 204 is disposed or is made incident on a position deviating from an incident surface of the sensor 18. On the other hand, among environment lights such as sunlight scattered by some object, there are lights traveling along the optical axis O2. These lights are made incident on the incident surface of the sensor 18 at random and become random noise.

Note that, in FIG. 2, optical paths of the laser light L1 and the reflected light L2 are separately shown for clarification. However, actually, the laser light L1 and the reflected light L2 overlap. An optical path in the center of a light beam of the laser light L1 is shown as the optical axis O1. Similarly, an optical path of the center of a light beam of the reflected light L2 is shown as the optical axis O2.

The sensor 18 detects the reflected light L2 made incident from the lens 18a. The sensor 18 is composed of, for example, a silicon photomultiplier (SiPM). The silicon photomultiplier is a photocounting device obtained by converting an avalanche photo diode (APD) in a Geiger mode into multiple pixels. The silicon photomultiplier is capable of detecting feeble light in a photocounting level. That is, each of light receiving elements configuring the sensor 18 outputs an output signal corresponding to the intensity of light received via the optical mechanism system 200. The avalanche photodiode used in the Geiger mode is sometimes called SPAD (single-photon avalanche diode).

The sensor 18 according to this embodiment is composed of the silicon photomultiplier but is not limited to this. For example, the sensor 18 may be configured by disposing a plurality of photodiodes, avalanche breakdown diodes (ABDs), or the like. The photodiode is composed of, for example, a semiconductor functioning as a photodetector. The avalanche diode is a diode that causes avalanche breakdown at a specific inverse voltage to thereby increase light reception sensitivity.

The second amplifier 20 is, for example, a transimpedance amplifier. The second amplifier 20 amplifies an electric signal based on the reflected light L2. The second amplifier 20 amplifies and converts, for example, a current signal of the sensor 18 into a voltage signal serving as a measurement signal.

The time acquirer 21 acquires a rising time in which a measurement signal obtained by converting reflected light of the laser beam L1 into a signal reaches a first threshold and a falling time in which the measurement signal reaches a second threshold after reaching the first threshold.

The distance measurer 22 measures the distance to the measurement target object 10 on the basis of a time difference between timing based on a first time obtained by weighting the rising time acquired by the time acquirer 21 with a first weight coefficient and a second time obtained by weighting the falling time acquired by the time acquirer 21 with a second weight coefficient and irradiation timing of the laser beam L1.

Figure 5:
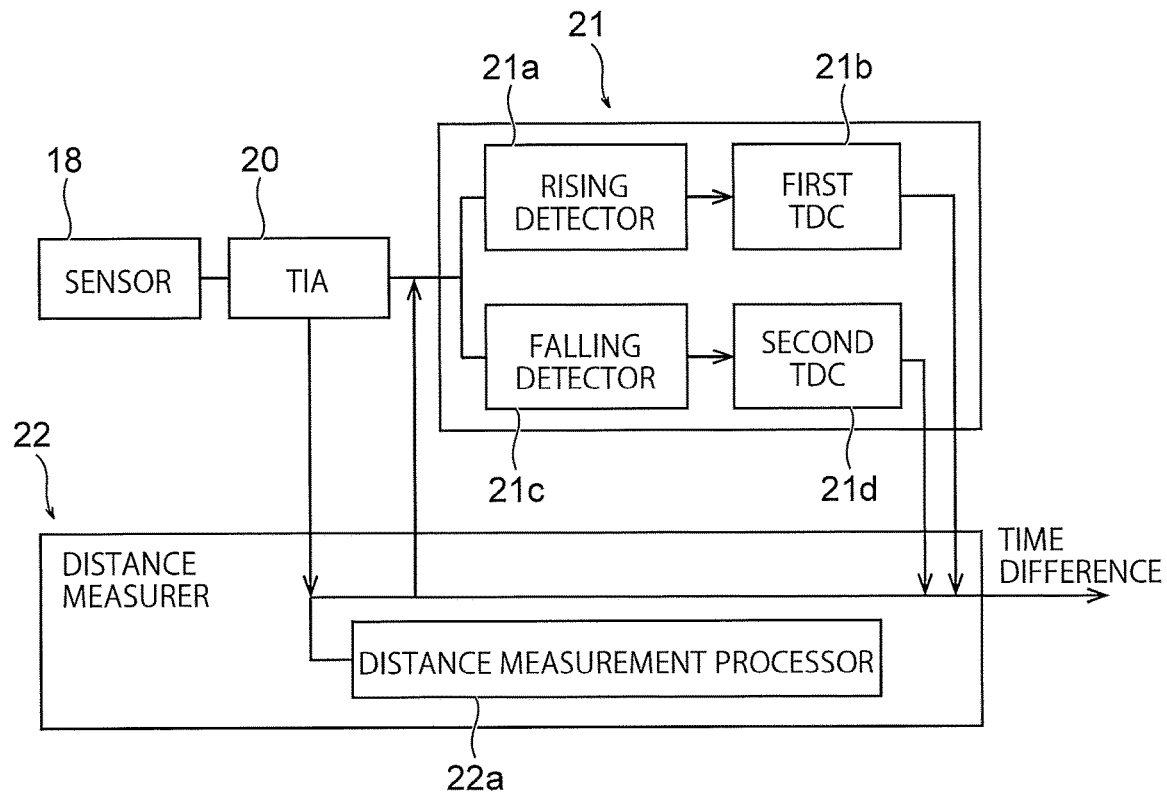
FIG. 5 is a block diagram showing a detailed configuration of a time acquirer and a distance measurer.

FIG. 5 is a block diagram showing a detailed configuration of the time acquirer 21 and the distance measurer 22. As shown in FIG. 5, the time acquirer 21 includes a rising detector 21a, a first TDC 21b, a falling detector 21c, and a second TDC 21d. The distance measurer 22 includes a distance measurement processor 22a. The block diagram of FIG. 5 shows an example of signals. Order of the signals and wiring for the signals are not limited to order and wiring shown in FIG. 5.

Figure 6:
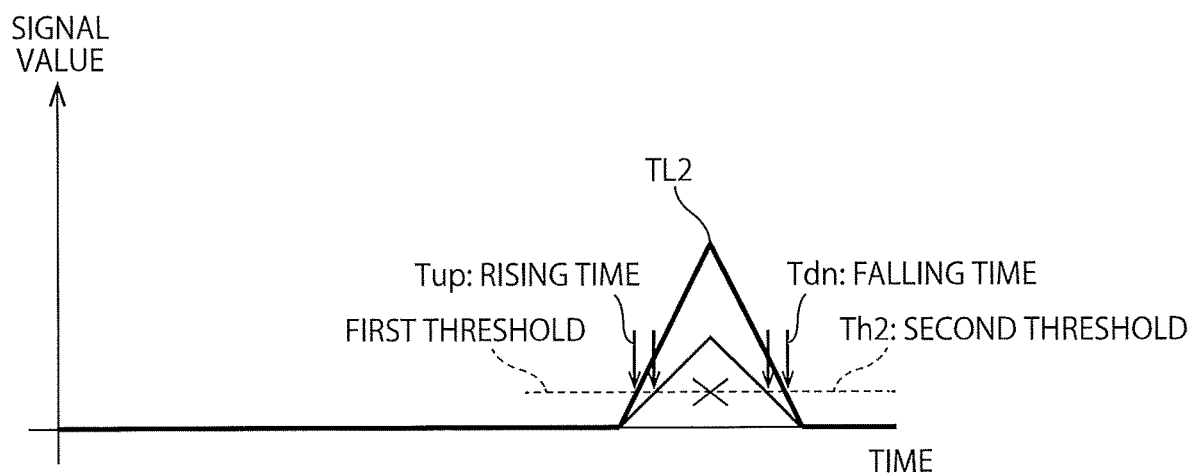
FIG. 6 is a diagram showing an example of a rising time and a falling time of a measurement signal by a time detector.

FIG. 6 is a diagram showing an example of a rising time and a falling time of a measurement signal by the time detector 21. The horizontal axis of FIG. 6 indicates an elapsed time from light emission time of the laser beam L1. The vertical axis of FIG. 6 indicates a signal value of the measurement signal. Two kinds of signals having different values at peak timing TL2 of the measurement signal are shown. A rising time Tup in which the measurement signal reaches a first threshold Th1 and a falling time Tdn in which the measurement signal falls and reaches a second threshold Th2 after reaching the first threshold are respectively shown with respect to the two kinds of measurement signals.

As shown in FIG. 5, the rising detector 21a is, for example, a comparator. The rising detector 21a compares a signal value of a measurement signal output by the second amplifier 20 and the first threshold and outputs a rising signal at time when the signal value of the measurement signal exceeds the first threshold. That is, when the measurement signal reaches the first threshold according to the positive theory, the rising detector 21a outputs the rising signal.

The first TDC 21b is, for example, a time to digital converter (TDC). The first TDB 21b measures the rising time Tup from when the laser beam L1 is emitted until the rising detector 21a outputs the rising signal. That is, the first TDB 21b acquires the rising time Tup in which a measurement signal obtained by converting reflected light of the laser beam into a signal reaches the first threshold.

The falling detector 21c is, for example, a comparator. The falling detector 21c compares the signal value of the measurement signal output by the second amplifier 20 and the second threshold and outputs a falling signal at time when the signal value of the measurement signal exceeds the second threshold. That is, when the measurement signal reaches the second threshold according to the negative theory, the falling detector 21c outputs the falling signal. For example, when the signal value of the measurement signal decreases and reaches the second threshold after reaching the first threshold, the falling detector 21c outputs the falling signal. That is, a time when the rising signal is output corresponds to a time when the measurement signal reaches the second threshold after reaching the first threshold after light emission time of the laser beam L1.

The second TDC 21d is, for example, a time to digital converter (TDC). The second TDC 21d measures the falling time Tdn from when the laser beam L1 is emitted until the falling detector 21c outputs the falling signal. That is, the second TDC 21d acquires the falling time Tdn in which the measurement signal obtained by converting the reflected light of the laser beam into a signal reaches the second threshold.

The measurement signal may be negatively reversed and subjected to threshold processing. In this case, the rising detector 21a compares the signal value of the measurement signal output by the second amplifier 20 and the first threshold and outputs the rising signal when the signal value of the measurement signal changing in time series decreases as time elapses and exceeds the first threshold. The falling detector 21c compares the signal value of the measurement signal output by the second amplifier 20 and the second threshold and outputs the falling signal when the signal value of the measurement signal changing in time series increases as time elapses and exceeds the second threshold after reaching the first threshold.

The distance measurer 22 includes, for example, an adder, a subtractor, a multiplier, and a divider. The distance measurer 22 measures the distance to a target object on the basis of the rising time Tup (FIG. 6) and the falling time Tdn (FIG. 6) acquired by the time acquirer 21. That is, the distance measurement processor 22a measures the distance to the target object on the basis of a time difference between timing based on a first time obtained by weighting the rising time Tup (FIG. 6) with a first weight coefficient W1 and a second time obtained by weighting the falling time Tdn (FIG. 6) with a second weight coefficient W2 and irradiation timing of the laser beam. For example, the distance measurement processor 22a acquires timing TL3 corresponding to the peak timing TL2 of the measurement signal on the basis of the first time obtained by weighting the rising time Tup (FIG. 6) with the first weight coefficient W1 and the second time obtained by weighting the falling time Tdn (FIG. 6) with the second weight coefficient W2. That is, the timing TL3 can be indicated by the timing TL3=the first weight coefficient W1×the rising time Tup+the second weight coefficient W2×the falling time Tdn. The first threshold Th1 (FIG. 6) according to this embodiment is equal to the second threshold Th2 (FIG. 6). Therefore, there is a relation of the second weight coefficient W2=(1−the first weight coefficient W1).

In this way, the distance measurement processor 22a measures the distance to the target object on the basis of an equation; a measurement distance=light speed×(the timing TL3−the timing TL1 when the photodetector 17 detects the laser beam L1)/2. In this way, the measurement distance can be indicated as Expression (1). Also, the measurement distance may be calculated based on the power of Tup.

[Expression 1]

Measurement distance=light speed×((W1×Tup+(1−W1)×Tdn)−TL1)/2   Expression (1)

Each of the time acquirer 21 and the distance measurer 22 is composed of hardware. For example, each of the time acquirer 21 and the distance measurer 22 is composed of a circuit. As explained above, the second threshold Th2 according to this embodiment is set to the same value as the first threshold Th1 in order to simplify calculation of a weight coefficient. However, the second threshold Th2 is not limited to this.

Figure 7:
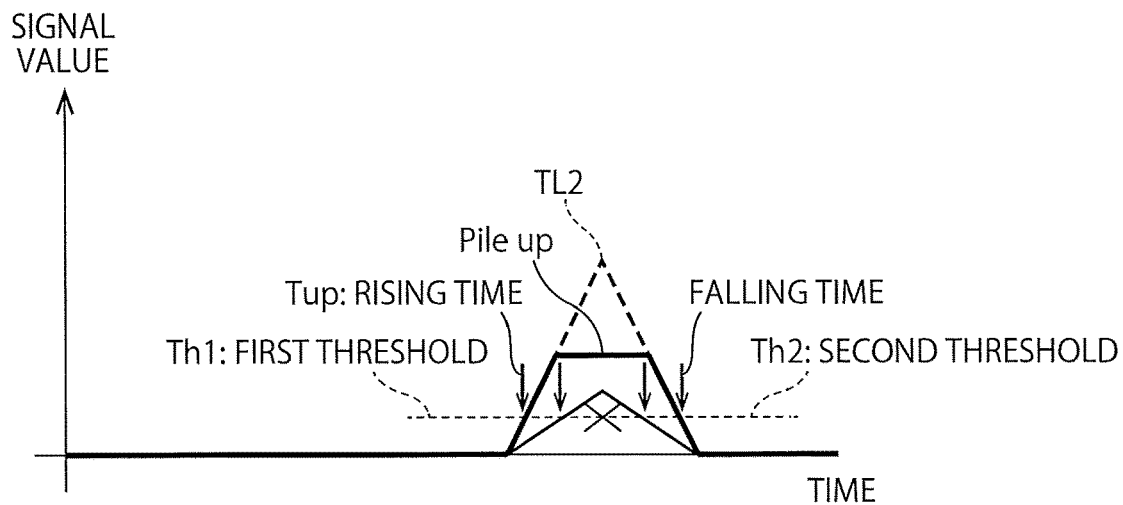
FIG. 7 is a diagram schematically showing a state in which a measurement signal of a sensor piles up.

FIG. 7 is a diagram schematically showing a state in which a measurement signal of the sensor 18 (FIG. 1) piles up. The horizontal axis indicates an elapsed time from light emission time of the laser beam L1. The vertical axis indicates a signal value of the measurement signal. Two kinds of signals having different peak values of the measurement signal are shown. The sensor 18 (FIG. 1) according to this embodiment is composed of an SPAD cell. A relation between the number of received photons per unit time and an output value of the SPAD cell has a linear characteristic when the number of received photons per unit time is small. On the other hand, when the number of received photons per unit time increases, the output value of the SPAD cell is saturated. The relation between the number of received photons per unit time and the output value of the SPAD cell has a nonlinear characteristic. Therefore, as shown in FIG. 7, a peak of the measurement signal sometimes becomes gentle. This is called pile-up.

FIGS. 8 to 11 are diagrams for explaining a simulation example of the timing TL3 at the time when the measurement signal piles up. It is explained below that, even if the measurement signal piles up, the timing TL3 based on the first time obtained by weighting the rising time Tup with the first weight coefficient W1 and the second time obtained by weighting the falling time Tdn with the second weight coefficient W2 indicates a value substantially equal to a value at the peak timing TL2 (FIG. 6).

Figure 8:
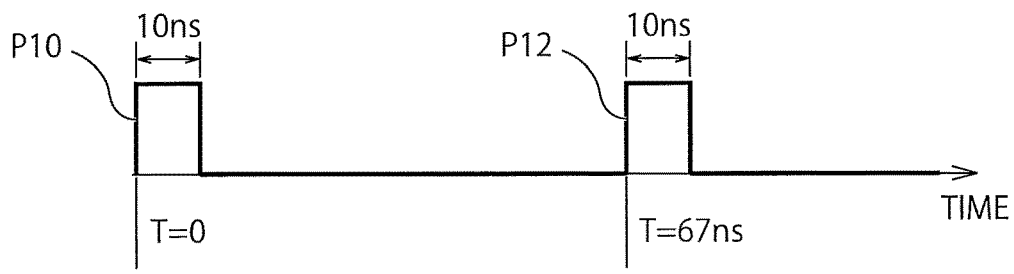
FIG. 8 is a diagram for explaining a temporal relation between an emission point in time of the light source and conversion into an electric signal by the sensor.

FIG. 8 is a diagram for explaining a temporal relation between an emission point in time of the light source 11 and conversion into an electric signal by the sensor 18. The horizontal axis indicates time. P10 indicates an example of an irradiation time of laser pulse light irradiated by the light source 11. T=0 indicates an irradiation start time. 10 ns indicates a pulse width. P12 indicates a time range in which the laser pulse light irradiated at P10 is reflected and returns from the measurement target object 10 present 10 meters ahead. That is, since round-trip speed of light is 6.7 ns/m, when the distance to the measurement target object 10 is 10 m, the time range is 67 ns. Therefore, when the measurement target object 10 is present 10 meters ahead, photons received in a time range of T=67 to T=77 ns in a measurement environment such as the outdoor are reflected light of the laser pulse light and environment light. Photons received in the other time are the environment light.

Figure 9:
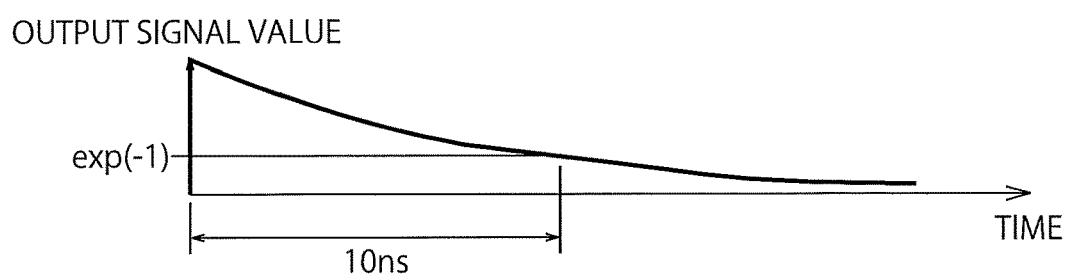
FIG. 9 is a diagram showing an output waveform example during one photon detection of an SPAD cell.

FIG. 9 is a diagram showing an output waveform example during one photon detection of the SPAD cell. When an output waveform is represented as I(t), the output waveform I(t) is approximately indicated by Expression (2). An output time constant of the SPAD cell is set to 10 ns. I0 indicates an output signal value at t=0.

[Expression 2]

$I(t) \propto \exp(-t/10 \text{ ns})$, or $I(t) = I0 \times \exp(-t/10 \text{ ns})$   Expression (2)

Figure 10:
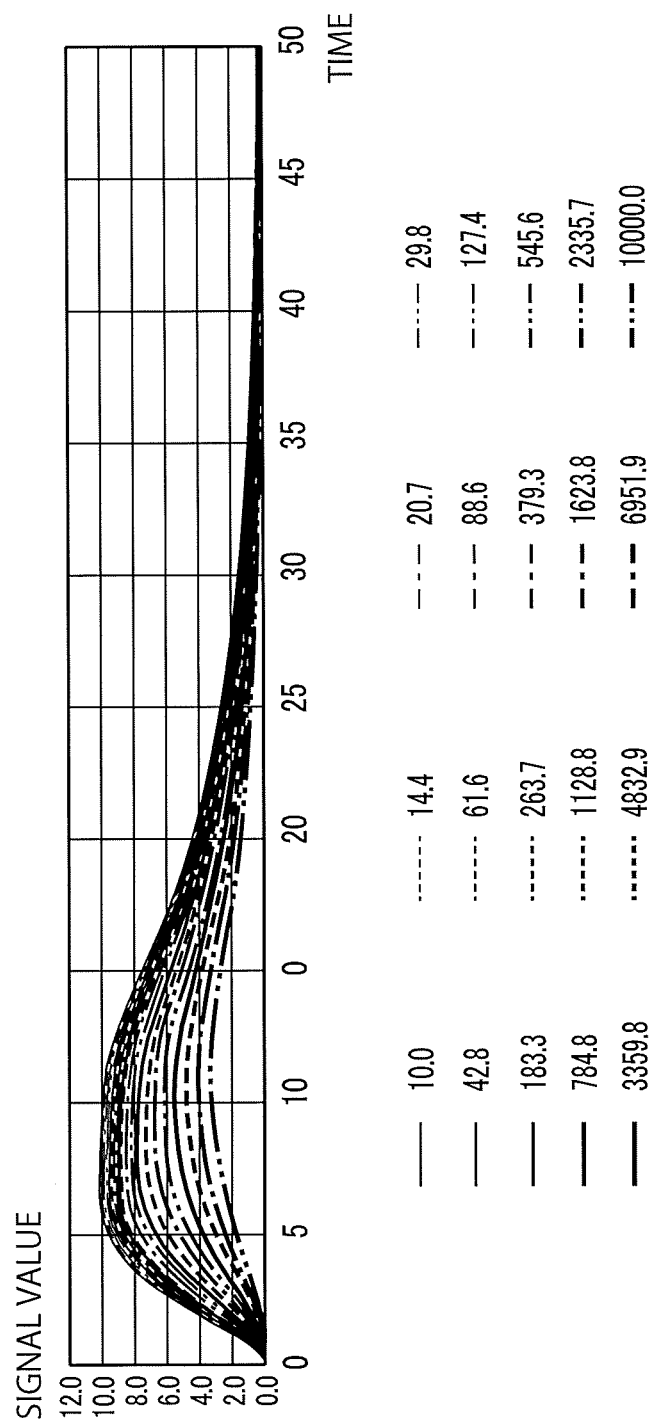
FIG. 10 is a diagram showing a simulation example of a measurement signal value of the SPAD cell.

FIG. 10 is a diagram showing a simulation example of a measurement signal value of the SPAD cell at the time when the pile-up is not considered. The vertical axis indicates a measurement signal value. The horizontal axis indicates time "t". A PDE (the number of detected photons/the number of input photons) of the SPAD cell is set to 10 percent. The number of SPAD cells per one pixel is set to 10. The output waveform I(t) indicated by Expression (2) is used. Under this condition, as the number of excited photons before pile-up, for example, during input of ten photons, one photon can be detected in average. During input of ten thousand photons, as the number of excited photons before pile-up, one thousand photons (=10000×10%) can be detected in average. In FIG. 10, a simulation is performed with the number of photons per unit time, that is, photons/input time set to 10.0, 14.4, 20.7, 29.8, 42.8, 61.6, 88.6, 127.4, 183.3, 263.7, 379.3, 545.6, 784.8, 1128.8, 1623.8, 2335.7, 3359.8, 4832.9, 6951.9, and 10000.0. Environment light is set to 0. An output band of the second amplifier 20 (FIG. 1) is set to 100 MHZ.

In the simulation, the rising time Tup and the falling time Tdn at the time when the first threshold Th1=the second threshold Th2¬=0.2 are calculated. The first weight coefficient W1 with which a distance measurement result does not change with respect to the number of excited photons before pile-up is calculated. That is, the first weight coefficient W1 with which the timing TL3 and the peak timing TL2 of the measurement signal shown in FIG. 10 coincide most is calculated. More specifically, the first weight coefficient W1 with which TL3=(W1×Tup+(1−W1)×Tdn) coincides most with the peak timing TL2 of the measurement signal shown in FIG. 10 is calculated. With such calculation, in this parameter example, the first weight coefficient W1=0.71 is calculated.

Figure 11:
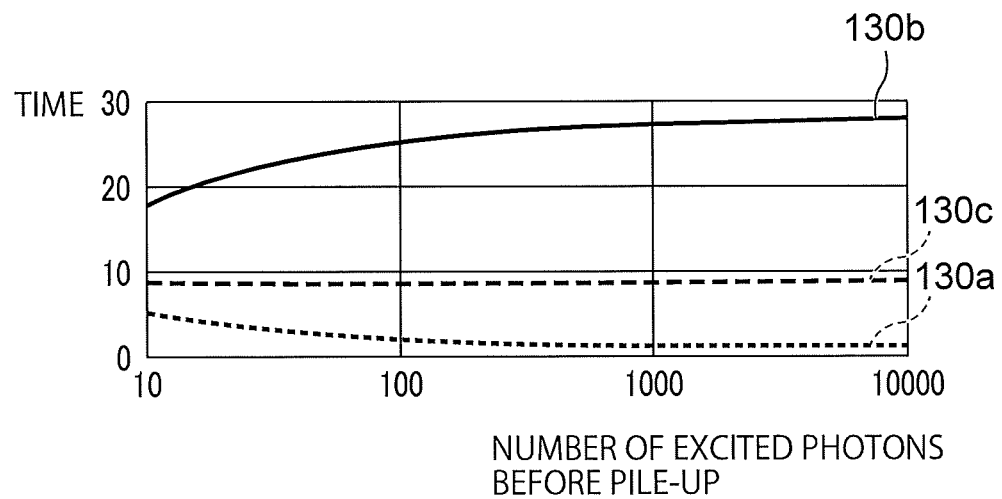
FIG. 11 is a diagram showing a relation between calculated timing and a rising time and a falling time.
Figure 12:
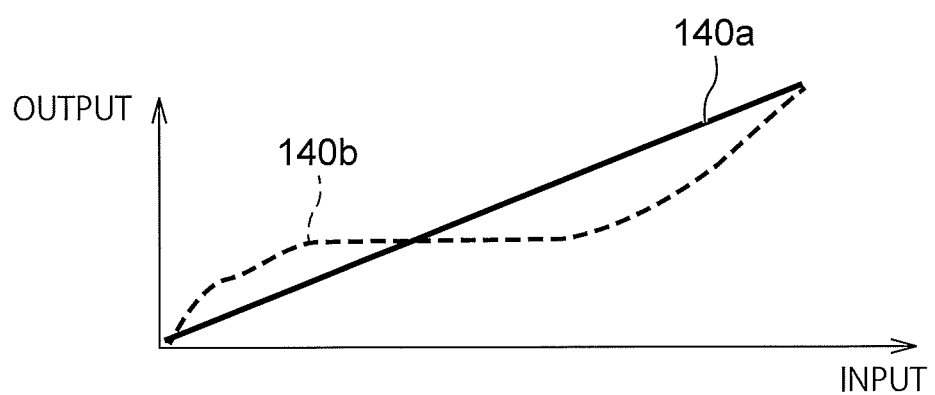
FIG. 12 is a diagram showing input and output characteristics of a second amplifier.

FIG. 11 is a diagram showing a relation between the timing TL3 calculated using the first weight coefficient W1=0.71 and the rising time Tup and the falling time Tdn. The vertical axis indicates time. The horizontal axis indicates the number of excited photons before pile-up. A first line 130a indicates the rising time Tup. A second line 130b indicates the falling time Tdn. A third line 130c indicates the timing TL3. As shown in FIG. 12, the rising time Tup and the falling time Tdn fluctuate according to the number of excited photons before pile-up. On the other hand, even if the number of excited photons before pile-up is changed, the timing TL3 calculated using the first weight coefficient W1=0.71 indicates a substantially fixed value, that is, 8.9 ns.

As it is seen from the above, even if the number of excited photons before pile-up is changed, it is possible to calculate the timing TL3 substantially the same as the peak timing TL2 of the measurement signal shown in FIG. 12 using one first weight coefficient W1=0.71. In this way, even if the number of excited photons before pile-up is changed, by setting the first threshold Th1 and the second threshold Th2 in a range in which linearity of an input and output characteristic of the SPAD cell is maintained, it is possible to calculate the timing TL3 substantially the same as the peak timing TL2 of the measurement signal shown in FIG. 12 even if the measurement signal piles up. According to the same calculation, it is possible to calculate the first weight coefficient W1 in advance for the sensor 18 having different characteristics as well. Furthermore, the sensor 18 according to this embodiment is composed of a silicon photomultiplier tube but is not limited to this. The first weight coefficient W1 can be calculated for other types of imaging elements.

A reduction effect for waveform distortion caused by the second amplifier 20 is explained with reference to FIGS. 12 and 13. FIG. 12 is a diagram showing input and output characteristics of the second amplifier 20. The vertical axis indicates an output signal value. The horizontal axis indicates an input signal value. An input and output characteristic 140a is linear and indicates an ideal input and output characteristic. An input and output characteristic 140b is nonlinear and indicates an input and output characteristic with distortion.

Figure 13:
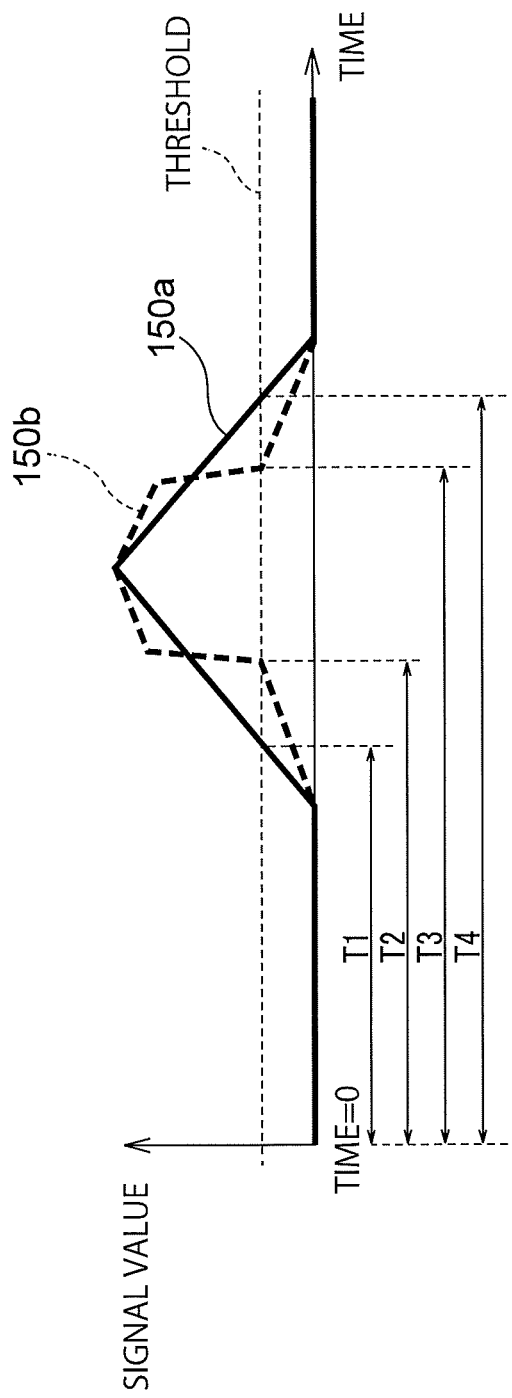
FIG. 13 is a diagram showing signal values based on different input and output characteristics.

FIG. 13 is a diagram showing a signal value based on the ideal input and output characteristic and a signal value based on the input and output characteristic with distortion. The vertical axis indicates a signal value. The horizontal axis indicates time. A signal value 150a is a signal value obtained when the second amplifier 20 having the ideal input and output characteristic is used. A signal value 150b is a signal value obtained when the second amplifier 20 having the input and output characteristic with distortion is used. The signal values 150a and 150b with the first weight coefficient W1=0.5 are data in a range in which pile-up of the sensor 18 (FIG. 1) does not occur.

A measurement distance by the signal value 150a is (0.5*T1+0.5*T4)/6.7. A measurement distance by the signal value 150b is (0.5*T2+0.5*T3)/6.7. As a premise, T2−T1=T4−T3. Therefore, the measurement distance by the signal value 150a is equal to the measurement distance by the signal value 150b. As it is seen from this, when the calculation method according to this embodiment indicated by Expression (1) is used, it is possible to prevent deterioration in measurement accuracy even if the second amplifier 20 having the input and output characteristic with distortion is used. By setting a threshold in the range in which the linearity of the input and output characteristic of the sensor 18 (FIG. 1) is maintained as explained above, it is possible to prevent deterioration in measurement accuracy even if the measurement signal is saturated or piles up and even if the second amplifier 20 having the input and output characteristic with distortion is used.

In this embodiment, the current signal is converted into the measurement signal by the second amplifier 20. However, the conversion of the current signal into the measurement signal is not limited to this. The current signal may be converted into the measurement signal by the second amplifier 20 and an AD converter or the like. In this case, it is possible to prevent deterioration in measurement accuracy even if the AD converter has the input and output characteristic with distortion.

Figure 14:
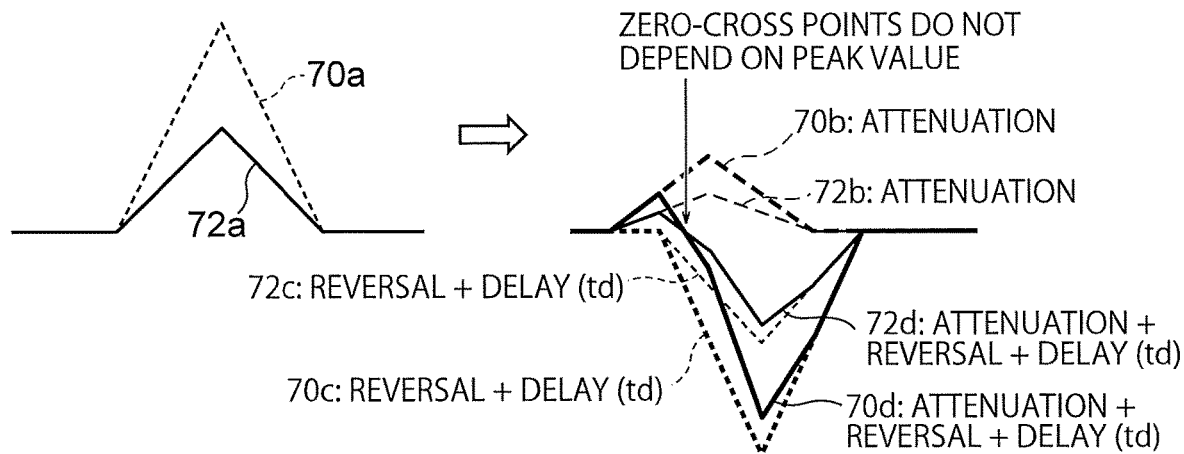
FIG. 14 is a diagram showing a measuring method of a CFD as a comparative example.

FIG. 14 is a diagram showing a measurement method for a CFD as a comparative example. As shown in FIG. 14, the CFD (constant fraction discriminator) acquires attenuation signals 70b and 72b obtained by attenuating measurement signals 70a and 72a. The CFC reverses and delays the measurement signals 70a and 72a to acquire signals 70c and 72c. The CFD acquires signals 70d and 72d obtained by adding the reversed and delayed signals 70c and 72c to the attenuation signals 70b and 72b. The CFD uses zero-cross points of the signals 70d and 72d as reference times of distance measurement. As shown in FIG. 14, when saturation and pile-up do not occur, the influence of peak values of the measurement signals 70a and 72a can be prevented. However, in the CFD, when saturation or pile-up occurs, the zero-cross points deviate in the measurement signals 70a and 72a. Accuracy of distance measurement is deteriorated. On the other hand, according to this embodiment, the reference time of the distance measurement is acquired on the basis of the rising time Tup in which the measurement signal reaches the first threshold and the falling time Tdn in which the measurement signal falls and reaches the second threshold after reaching the first threshold. Therefore, it is possible to prevent the influence on measurement accuracy even if saturation or pile-up occurs in the measurement signals 70a and 72a.

As explained above, according to this embodiment, the distance to the target object is measured on the basis of the rising time Tup in which the measurement signal reaches the first threshold and the falling time Tdn in which the measurement signa falls and reaches the second threshold after reaching the first threshold. Consequently, it is possible to reduce the influence of a measurement signal having a value equal to or larger than the first threshold on the distance measurement. It is possible to accurately and stably measure the distance to the target object even if the measurement signal, for example, piles up or is saturated.

Second Embodiment

In a second embodiment, a measurement distance is more highly accurately acquired by acquiring a weight coefficient referring to at least one of an intensity value of a measurement signal and an intensity value of environment light. In the following explanation, differences from the first embodiment are explained.

Figure 15:
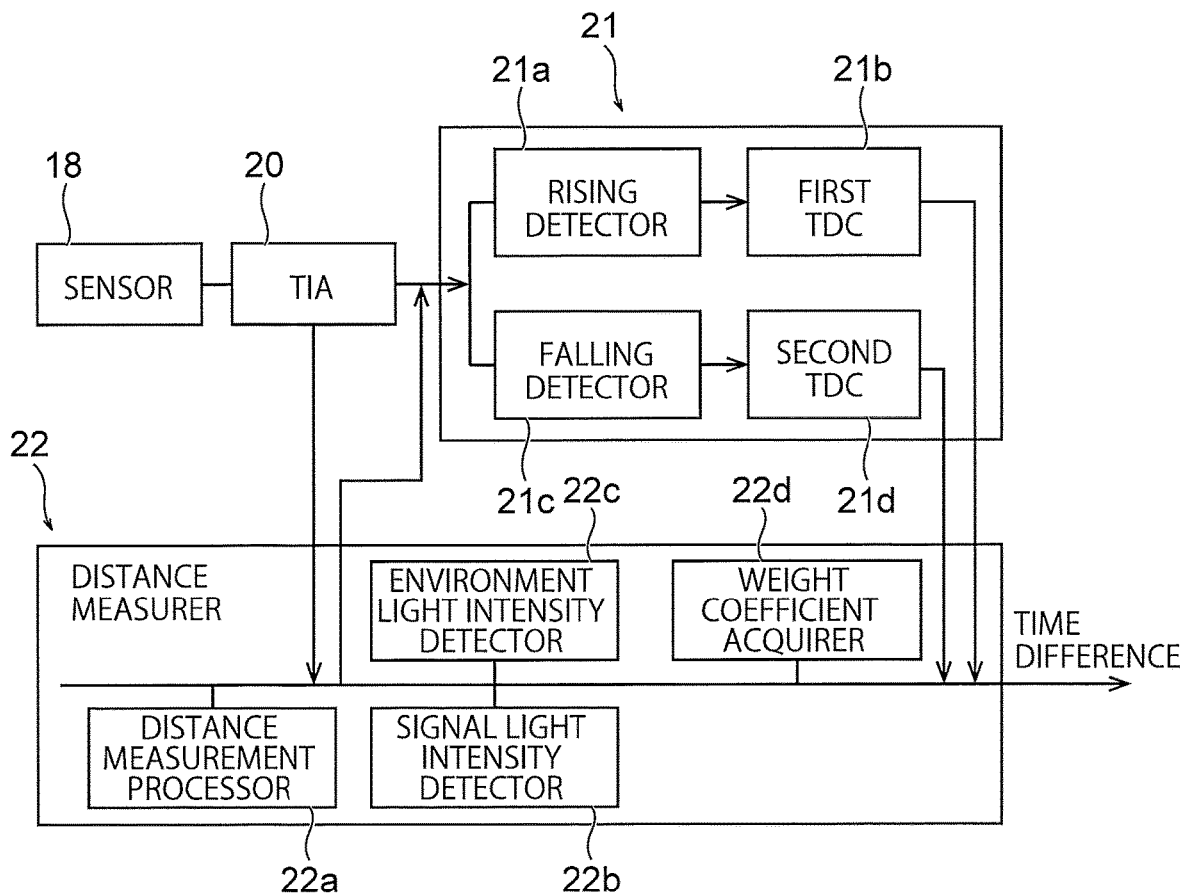
FIG. 15 is a block diagram showing a detailed configuration example of a distance measurement processor according to a second embodiment.

FIG. 15 is a block diagram showing a detailed configuration example of the distance measurer 22 according to the second embodiment. As shown in FIG. 15, the distance measurer 22 includes a signal light intensity detector 22b, an environment light intensity detector 22c, and a weight coefficient acquirer 22d. Each of the signal light intensity detector 22b, the environment light intensity detector 22c, and the weight coefficient acquirer 22d is composed of hardware. For example, each of the signal light intensity detector 22b, the environment light intensity detector 22c, and the weight coefficient acquirer 22d is composed of a circuit. The block diagram of FIG. 15 shows an example of signals. Order of the signals and wiring for the signals are not limited to order and wiring shown in FIG. 15.

The signal light intensity detector 22b acquires, for example, a maximum value as a first representative value of a measurement signal in a time T from when the light source 11 (FIG. 1) irradiates a laser beam $L1(n)$ until the light source 11 irradiates the next laser beam $L1(n+1)$. The signal light intensity detector 22b may acquire a maximum value of a signal value after reducing noise with filtering processing.

The environment light intensity detector 22c detects the intensity of environment light. More specifically, the environment light intensity detector 22c acquires, for example, an average value as a second representative value of the measurement signal in the time T in a period in which the light source 11 (FIG. 1) stops irradiation of a laser beam. The environment light intensity detector 22c may acquire a representative value after reducing noise with filtering processing. The second representative value may be a maximum value, an intermediate value, or the like of the measurement signal in the time T.

The weight coefficient acquirer 22d acquires the weight coefficients W1 and W2 on the basis of at least one of the first representative value detected by the signal light intensity detector 22b and the second representative value detected by the environment light intensity detector 22c. As explained above, the second weight coefficient W2 according to this embodiment has the relation of $W2=(1-W1)$. Consequently, the distance measurement processor 22a substitutes the first weight coefficient W1 acquired by the weight coefficient acquirer 22d in Expression (1) described above and measures the distance to the measurement target object 10. In this way, the distance measurement processor 22a changes the first weight coefficient W1 according to at least one of the signal intensity of the measurement signal and the environment light intensity.

The weight coefficient acquirer 22d is explained more in detail with reference to FIGS. 16 to 20.

Figure 16:
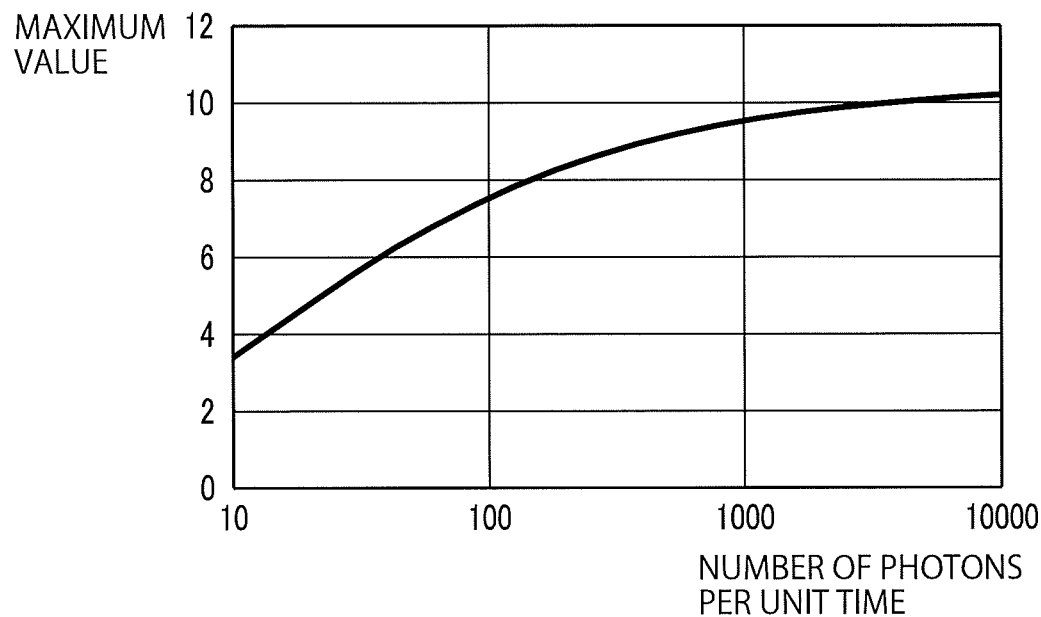
FIG. 16 is a diagram showing a maximum value of measurement signal values obtained by changing the number of photons per unit time.

FIG. 16 is a diagram showing a maximum value of a measurement signal value obtained by changing the number of photons per unit time shown in FIG. 10. The vertical axis indicates the maximum value of the measurement signal value. The horizontal axis indicates the number of photons per unit time, that is, photons/input time. As shown in FIG. 16, the maximum value of the measurement signal value corresponds to the number of photons per unit time. The maximum value has a tendency that the maximum value monotonously increases as the number of photons per unit time increases and an increase rate decreases as the number of photons increases.

Figure 17:
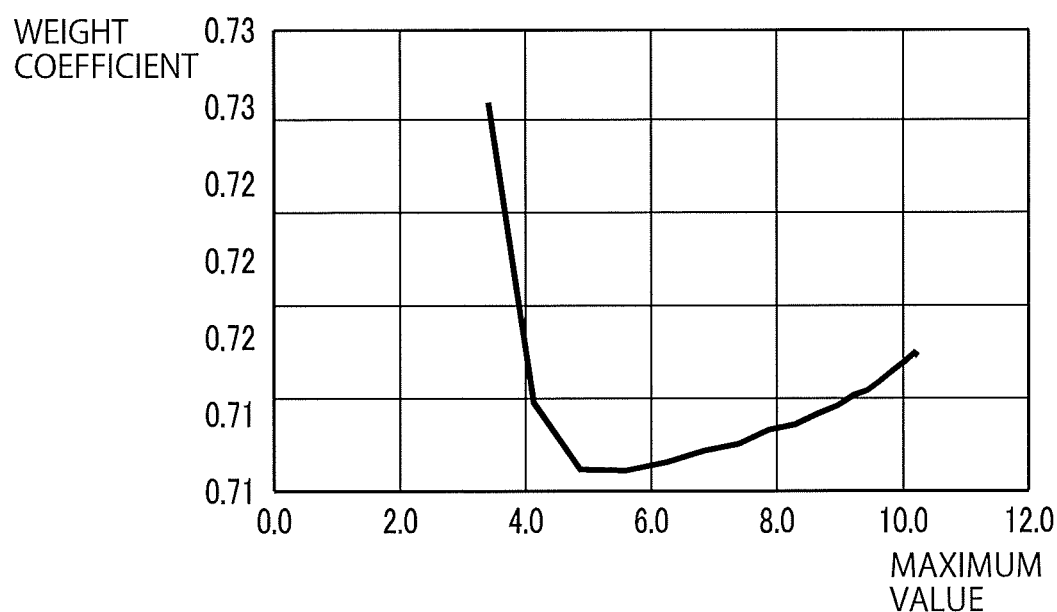
FIG. 17 is a diagram of a first weight coefficient calculated for each measurement signal value corresponding to the maximum value.

FIG. 17 is a diagram of the first weight coefficient W1 calculated for each measurement signal value corresponding to the maximum value shown in FIG. 16. The vertical axis indicates the first weight coefficient W1. The horizontal axis indicates the maximum value of the measurement signal value shown in FIG. 16.

The first weight coefficient W1 is a value calculated on the basis of the measurement signal for each number of photons per unit time shown in FIG. 10. That is, the rising time Tup and the falling time Tdn at the time when the first threshold Th1=the second threshold Th2¬=0.2 are calculated for each measurement signal. The weight coefficient W1 with which the timing TL3 and the peak timing TL2 of the measurement signal shown in FIG. 12 coincide most is calculated. As explained above, the maximum value of the measurement signal value corresponds to the number of photons per unit time. Therefore, the weight coefficient W1 with which the timing TL3 and the peak timing TL2 of the measurement signal coincide mode can be obtained for each maximum value of the measurement signal value.

As shown in FIG. 17, The first weighting factor W 1 monotonously decreases as the maximum value of the measured signal value increases and the first weighting factor W 1 increases monotonically with the predetermined value as the boundary as the maximum value of the measured signal value increases. In this way, the first weighting coefficient W 1 monotonically increases as the maximum value of the measured signal value increases when the maximum value of the measured signal value is equal to or larger than the predetermined value.

The weight coefficient acquirer 22d has stored therein, as a lookup table, for example, a relation between the maximum value and the first weight coefficient W1 shown in FIG. 17. Consequently, the weight coefficient acquirer 22d acquires the first weight coefficient W1 using, as an argument, the first representative value, that is, the maximum value detected by the signal light intensity detector 22b. In this way, the weight coefficient acquirer 22d acquires the first weight coefficient W1 on the basis of the first representative value, that is, the maximum value detected by the signal light intensity detector 22b. Therefore, the weight coefficient acquirer 22d can obtain the first weight coefficient W1 that is more highly accurately calculated. Consequently, the distance measurement processor 22a is capable of substituting the first weight coefficient W1 acquired by the weight coefficient acquirer 22d in Expression (1) described above and more highly accurately measuring the distance to the measurement target object 10.

Figure 18:
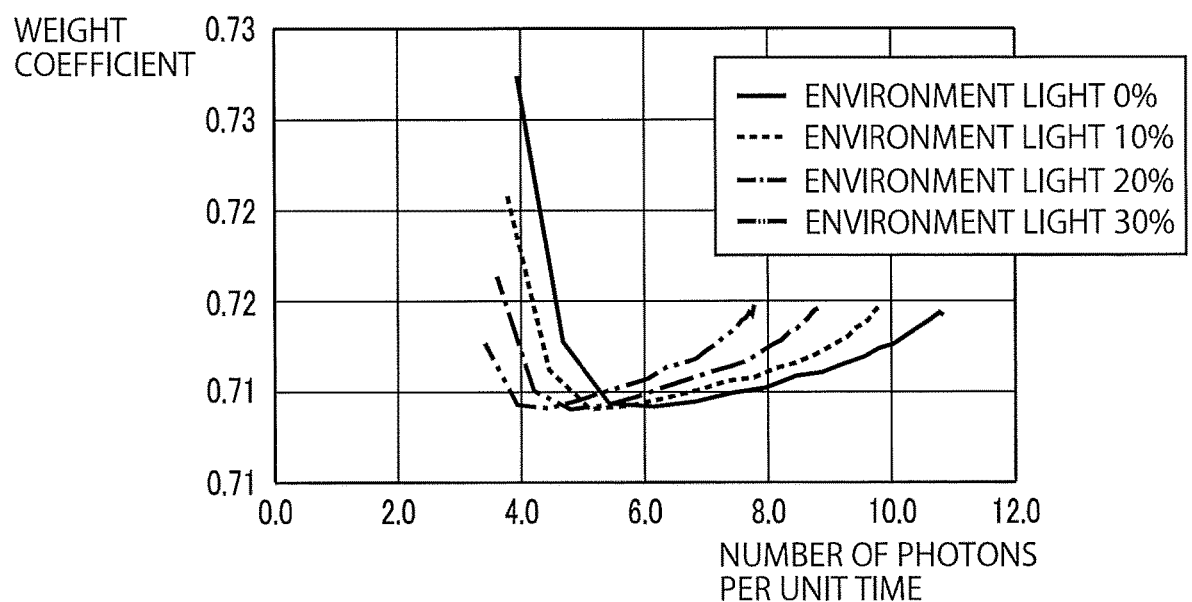
FIG. 18 is a diagram of the first weight coefficient corresponding to the maximum value calculated by changing an intensity value of environment light.

FIG. 18 is a diagram of the first weight coefficient W1 corresponding to the maximum value of the measurement signal calculated by changing an intensity value of environment light. The vertical axis indicates the first weight coefficient W1. The horizontal axis indicates the maximum value of the measurement signal value. The environment light is photons steadily made incident on the sensor 18 (FIG. 1). Therefore, the environment light excites an electric signal in a DC (direct current) manner. That is, as the environment light increases, an effect equivalent to the effect achieved when the number of SPADs is reduced is generated in average. Therefore, in FIG. 18, the intensity of the environment light is indicated as a percentage of a reduction of the number of SPADs. For example, 10% is equivalent to a reduction of 10% of the number of SPADs. 20% is equivalent to a reduction of 20% of the number of SPADs. 30% is equivalent to a reduction of 30% of the number of SPADs. That is, values of the first weight coefficient W1 for each intensity value of the environment light shown in FIG. 18 are obtained by performing calculation equivalent to the calculation in FIG. 17 while changing the number of SPAD cells.

As shown in FIG. 18, the weight coefficient acquirer 22d increases an increase rate of the first weight coefficient respect to an increase of a maximum value of the measured signal value as the intensity value of the environment light increases when the maximum value of the measurement signal is equal to or larger than a predetermined value.

The weight coefficient acquirer 22*d* has stored therein, as a lookup table, for example, a relation between the maximum value and the intensity value of the environment light and the first weight coefficient W1 shown in FIG. 18. Consequently, the weight coefficient acquirer 22*d* acquires the first weight coefficient W1 using, as arguments, the first representative value, that is, the maximum value detected by the signal light intensity detector 22*b* and the second representative value, that is, the average value of the measurement signal by the environment light detected by the environment light intensity detector 22*c*.

FIG. 18 is a diagram of the first weight coefficient W1 corresponding to the maximum value of the measurement signal calculated by changing an intensity value of environment light. Signal intensity by the environment light can be considered as a DC component of a measurement signal value.

Figure 19:
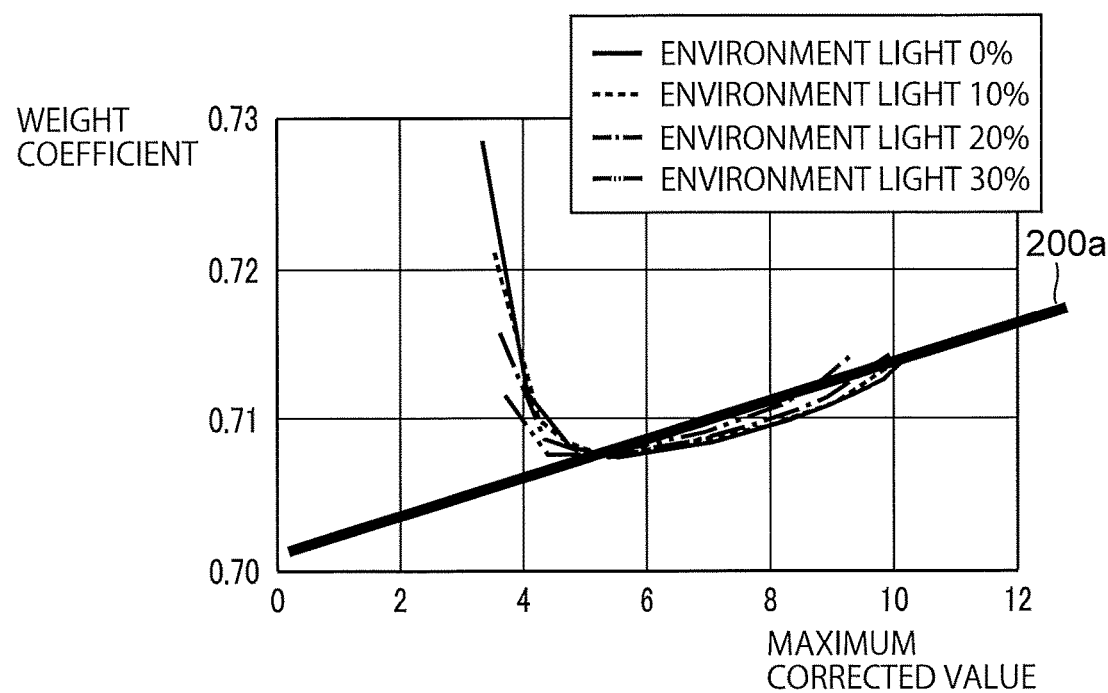
FIG. 19 is a diagram of the first weight coefficient corresponding to a corrected maximum value calculated by changing the intensity value of the environment light.

FIG. 19 is a diagram of the first weight coefficient W1 corresponding to a corrected maximum value of a measurement signal calculated by changing the intensity value of the environment light W1. The vertical axis indicates the first weight coefficient W1. The horizontal axis indicates a corrected maximum value of the measurement signal value. A corrected maximum value CMa is indicated by Expression (3).

[Expression 3]

$$CMa = Max(1+ES) \quad \text{Expression (3)}$$

A maximum value Ma is the first representative value detected by the signal light intensity detector 22*b*. An intensity value ES of the environment light is the second representative value detected by the environment light intensity detector 22*c*.

An approximate line 200*a* indicates an approximate line of the first weight coefficient W1 with respect to the corrected maximum value CMa.

The weight coefficient acquirer 22*d* has stored therein, as a lookup table, the approximate line 200*a* of the first weight coefficient W1 with respect to the corrected maximum value CMa. Alternatively, the weight coefficient acquirer 22*d* has stored therein, as a linear equation, the approximate line 200*a* of the first weight coefficient W1 with respect to the corrected maximum value CMa. The linear equation is a general primary regression equation. Therefore, description of the linear equation is omitted.

In this way, the approximate line 200*a* is stored as the lookup table. Therefore, a memory amount can be further reduced than when a lookup table is stored for each intensity value of the environment light. When the approximate line 200*a* is stored as the linear equation, the memory amount can be further reduced than when the lookup table is stored.

In this way, the weight coefficient acquirer 22*d* adds 1 to the intensity value ES of the environment light, which is the second representative value, detected by the environment light intensity detector 22*c*, multiplies the maximum value Ma, which is the first representative value, detected by the signal light intensity detector 22*b*, and acquires the corrected maximum value CMa. The weight coefficient acquirer 22*d* acquires the first weight coefficient W1 corresponding to the corrected maximum value CMa. When the corrected maximum value CMa is small, accuracy is low. However, in that case, the distance to the measurement target object 10 is considered to be long. Very high accuracy is considered to be unnecessary. The distance measurement processor 22*a* changes the first weight coefficient W1 according to the signal intensity of the measurement signal and the environment light intensity. Consequently, the measurement distance to the measurement target object 10 can be more highly accurately acquired.

As explained above, according to this embodiment, the first weight coefficient W1 used for weighting the rising time Tup and the falling time Tdn is acquired with reference to at least one of the intensity value of the measurement signal and the intensity value of the environment light. Consequently, even if the input and output characteristic of the sensor 18 changes according to the intensity value of the measurement signal and the intensity value of the environment light, it is possible to acquire the first weight coefficient W1 corresponding to the input and output characteristic. Even if the intensity value of the measurement signal and the intensity value of the environment light change, it is possible to accurately and stably measure the distance to a target object.

Third Embodiment

In a third embodiment, a measurement distance is more highly accurately acquired by changing the first weight coefficient according to a pulse width of a measurement signal. In the following explanation, differences from the second embodiment are explained.

Figure 20:
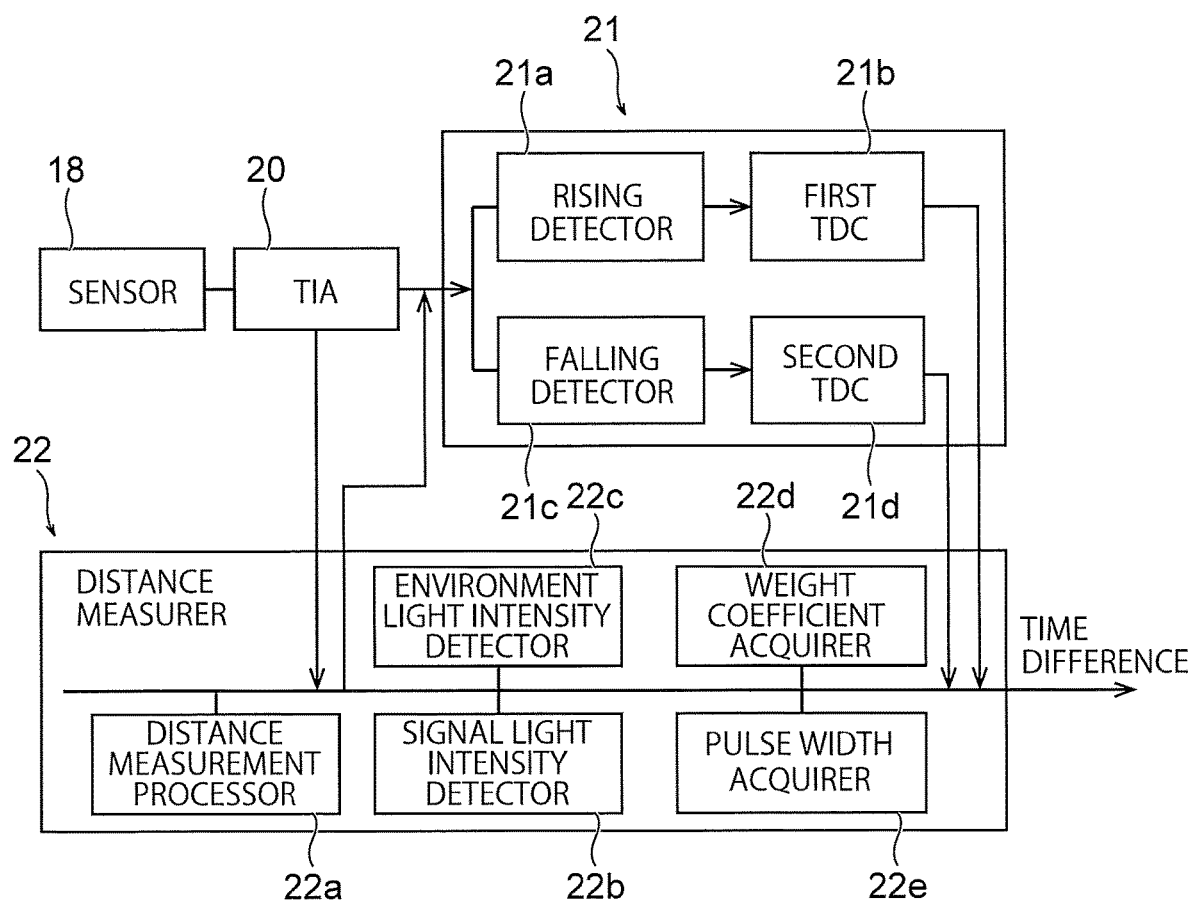
FIG. 20 is a block diagram showing a detailed configuration example of a distance measurement processor according to a third embodiment.

FIG. 20 is a block diagram showing a detailed configuration example of the distance measurer 22 according to the third embodiment. As shown in FIG. 20, the distance measurer 22 further includes a pulse width acquirer 22*e*. The pulse width acquirer 22*e* is composed of a circuit. The block diagram of FIG. 20 shows an example of signals. Order of the signals and wiring for the signals are not limited to order and wiring shown in FIG. 20.

The pulse width acquirer 22*e* acquires a pulse width on the basis of the rising time Tup detected by the rising detector 21*a* and the falling time Tdn detected by the falling detector 21*c*. For example, the pulse width acquirer 22*e* acquires a difference between the falling time Tdn and the rising time Tup as the pulse width. The falling detector 21*c* according to this embodiment is configured to output an error signal including information indicating a detection error when the falling detector 21*c* cannot detect the falling time Tdn even if the irradiation interval T of the light source 11 (FIG. 1) is exceeded.

Figure 21:
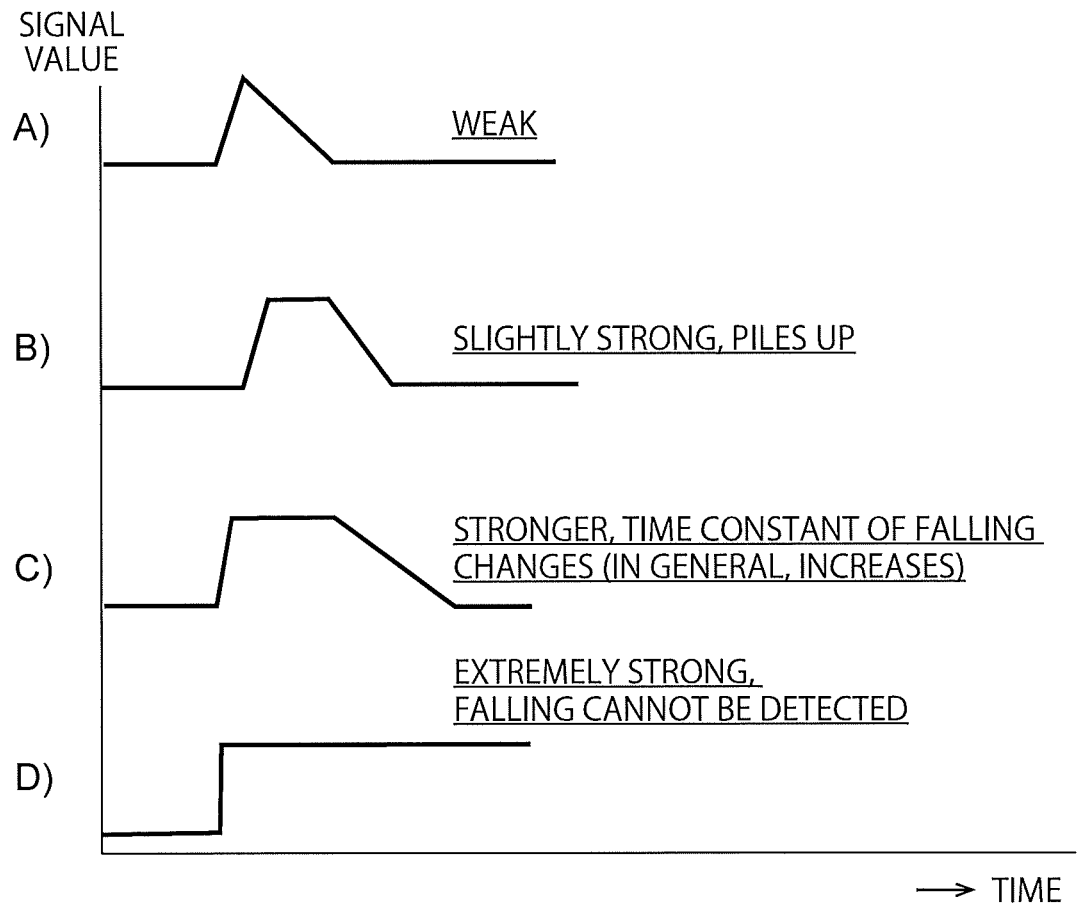
FIG. 21 is a conceptual diagram for explaining characteristics of a measurement signal according to pulse widths.

FIG. 21 is a conceptual diagram for explaining characteristics of a measurement signal according to pulse widths. The vertical axis indicates a measurement signal value. The horizontal axis indicates time. As shown in FIG. 21, the pulse widths increase in the order of A, B, C, and D.

In A, the number of photons per unit time is the smallest. In B, the number of photons per unit time is larger than the number of photons in A and the measurement signal piles up. In C, the number of photons per unit time is larger than the number of photons in B and a time constant of falling changes from the time constant in B. In D, the number of photons per unit time is larger than the number of photons in C and the falling detector 21*c* cannot detect the falling time Tdn. In this way, the characteristics of the measurement signal change according to the pulse widths.

Therefore, the distance measurement processor 22*a* changes an acquisition method for the first weight coefficient W1 on the basis of the pulse width acquired by the pulse width acquirer 22*e*. More specifically, when the pulse width corresponds to A, the distance measurement processor 22*a* integrates, for several laser irradiation, measurement signals output by the time division processor 21 and measures the distance to the measurement target object 10 on the basis of a peak value of an integrated signal. When the pulse width corresponds to B, the distance measurement processor 22a measures the distance to the measurement target object 10 on the basis of Expression (1) as explained above.

Figure 22:
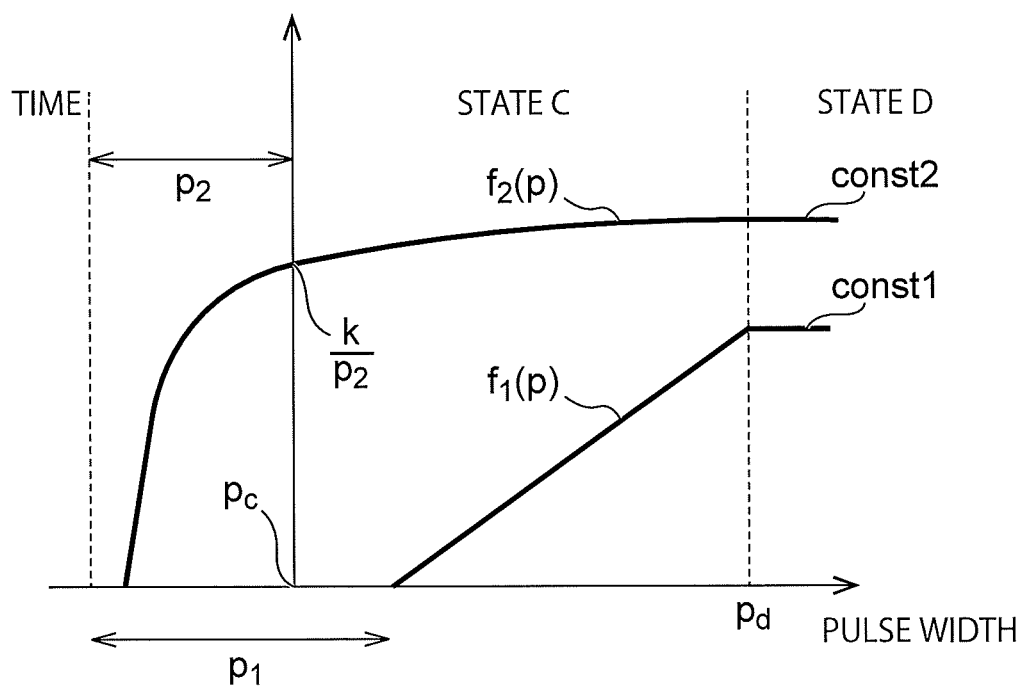
FIG. 22 is a diagram for explaining characteristics of functions used in arithmetic expressions corresponding to C and D.

FIG. 22 is a diagram for explaining characteristics of functions used in arithmetic expressions corresponding to C and D. The vertical axis indicates a value of a function. The horizontal axis indicates a pulse width P. P=Tup-Tdn and P1 and P2 are constants serving as fitting parameters. As shown in FIG. 22, a function f1(p) is a function that is 0 up to a pulse width P1, linearly increases according to a linear equation of f1(p)=k×(P−P1) when the pulse width P exceeds a pulse width P1, and becomes a constant CONST1 when the pulse width reaches a pulse width Pd.

A function f2(p) is a function that monotonously increases according to an equation of f2(p)=k/(P+P$_2$) and becomes a constant CONST2 when the pulse width P reaches the pulse width Pd.

In a state of C in which the pulse width P is in a range of the pulse widths Pc to Pd, the distance measurement processor 22a acquires a measurement distance according to, for example, Expression (4).

[Expression 4]

$$\begin{aligned}\text{Measurement distance} &= \text{light speed} \times (Tup + f1(P))/2 \quad \text{Expression (4)} \\ &= \text{light speed} \times (Tup + k \times (P - P1))/2 \\ &= \text{light speed} \times (Tup + k \times (Tdn - Tup - P1))/2 \\ &= \text{light speed} \times ((1-k) \times Tup + k \times Tdn - k \times P1)/2 \\ &= \text{light speed} \times (W1 \times Tup + (1 - W1) \times Tdn - k \times P1)/2\end{aligned}$$

In Expression (4), (1-k) is represented as W1. As it is seen from this, Expression (4) is an expression equivalent to Expression (1) excluding k×P1, which is an offset component.

In a state of D in which the pulse width P is equal to or larger than Pd, the distance measurement processor 22a acquires a measurement distance according to, for example, Expression (5).

[Expression 5]

$$\text{Measurement distance} = \text{light speed} \times (Tup + CONST1)/2 \quad \text{Expression (5)}$$

In the state of C in which the pulse width P is in the range of the pulse widths Pc to Pd, the distance measurement processor 22a acquires a measurement distance according to, for example, Expression (6). In the state of C, since f2(P) monotonously increases, the weight of the rising time Tup becomes larger than the weight of the falling time Tdn as the pulse width P increases.

[Expression 6]

$$\text{Measurement distance} = \text{light speed} \times (Tup + f2(P) \times Tdn)/2 \quad \text{Expression (6)}$$

In the state of D in which the pulse width P is equal to or larger than Pd, f2(P) is treated as CONST2.

In this way, in the state of C in which the pulse width P is in the range of the pulse widths Pc to Pd, the rising time Tup is steep and the falling time Tdn is gentle. The rising time Tup has small input light amount dependency. The falling time Tdn has large input light amount dependency. By acquiring the measurement distance according to Expression (4) or Expression (6), it is possible to reduce the light amount dependency and reduce a measurement error.

In the state of D in which the pulse width is in a range of the pulse width Pd or more, the falling time Tdn sometimes cannot be acquired. However, in the state of D, the distance measurement processor 22a according to this embodiment does not use the falling time Tdn. Therefore, it is possible to measure a measurement distance. By introducing the pulse width P into the distance measurement in this way, a degree of freedom further increases and fitting accuracy of a measurement signal is further improved.

According to this embodiment, the weight of the rising time Tup is set larger than the weight of the falling time Tdn as the pulse width P increases. The rising time Tup has small input light amount dependency and the falling time Tdn has large input light amount dependency. Therefore, even if the input light amount dependency is reduced and the intensity value of the measurement signal further increases, it is possible to accurately and stably measure the distance to the target object.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A distance measuring device comprising:
    a time acquisition circuit configured to acquire a rising time in which a measurement signal obtained by converting reflected light of a laser beam from an object into a signal reaches a first threshold and a falling time in which the measurement signal reaches a second threshold after reaching the first threshold; and
    a distance measurement circuit configured to measure a distance to a target object on the basis of a time difference between timing based on the rising time and irradiation timing of the laser beam, wherein
    the distance measurement circuit acquires the timing based on a first time being obtained by weighting the rising time with a first weight coefficient which is acquired according to a pulse width of the measurement signal.

2. The distance measuring device according to claim 1, wherein the distance measurement circuit acquires the timing based on a second time being obtained by weighting the falling time with a second weight coefficient.

3. The distance measuring device according to claim 2, wherein the distance measurement circuit acquires the first weight coefficient according to at least one of signal intensity of the measurement signal and environment light intensity.

4. The distance measuring device according to claim 3, wherein the distance measurement circuit monotonically increases the first weight coefficient as an increase a maximum value of the measurement signal when the maximum value of the measurement signal is equal to or larger than a predetermined value.

5. The distance measuring device according to claim 3, wherein the distance measurement circuit increases an increase rate of the first weight coefficient with respect to an increase of a maximum value of the measured signal value as the environment light intensity increases when the maximum value of the measurement signal is equal to or larger than a predetermined value.

6. The distance measuring device according to claim 2, wherein, when a pulse width of the measurement signal exceeds a predetermined value, the distance measurement circuit measures the distance to the target object on the basis of a time difference between timing based on a value obtained by adding a predetermined value to the rising time and the irradiation timing of the laser beam.

7. The distance measuring device according to claim 1, wherein the distance measurement circuit increases the first weight coefficient as the pulse width increases.

8. The distance measuring device according to claim 1, further comprising: an amplifier configured to amplify and convert an electric signal output by a sensor on the basis of reflected light of a laser beam into a measurement signal.

9. The distance measuring device according to claim 1, further comprising:
an irradiation optical system configured to irradiate the laser beam on a measurement target object while changing an irradiation direction of the laser beam;
a light receiving optical system configured to receive reflected light of the laser beam irradiated by the irradiation optical system;
a sensor configured to convert the reflected light received via the light receiving optical system into an electric signal; and
an amplifier configured to amplify and convert the electric signal output by the sensor into the measurement signal, wherein
the distance measurer changes the first weight coefficient according to characteristics of the sensor.

10. The distance measuring device according to claim 9, wherein the sensor includes a plurality of avalanche photodiodes.

11. The distance measuring device according to claim 9, wherein the sensor is composed of a silicon photomultiplier.

12. The distance measuring device according to claim 9, wherein the sensor is composed of a photodiode.

13. A distance measuring method comprising:
acquiring a rising time in which a measurement signal obtained by digitizing reflected light of a laser beam from an object reaches a first threshold and a falling time in which the measurement signal reaches a second threshold after reaching the first threshold; and
measuring a distance to a target object on the basis of a time difference between timing based on a timing based on the rising time and irradiation timing of the laser beam, wherein
the timing is acquired based on a first time being obtained by weighting the rising time with a first weight coefficient which is acquired according to a pulse width of the measurement signal.

14. The distance measuring method according to claim 13, further comprising acquiring the timing based on a second time being obtained by weighting the falling time with a second weight coefficient.

15. The distance measuring method according to claim 14, further comprising amplifying and converting an electric signal output by a sensor on the basis of reflected light of a laser beam into the measurement signal.

16. The distance measuring method according to claim 14, further comprising acquiring the first weight coefficient according to at least one of signal intensity of the measurement signal and environment light intensity.

17. The distance measuring method according to claim 16, wherein an increase rate of the first weight coefficient with respect to an increase of a maximum value of the measured signal value is increased as the environment light intensity increases when the maximum value of the measurement signal is equal to or larger than a predetermined value.

18. The distance measuring method according to claim 14, wherein the first weight coefficient is monotonically increased as an increase a maximum value of the measurement signal when the maximum value of the measurement signal is equal to or larger than a predetermined value.

* * * * *